(12) United States Patent
Bank et al.

(10) Patent No.: US 9,189,959 B2
(45) Date of Patent: Nov. 17, 2015

(54) NAVIGATION SYSTEM PROVIDING A SUPER DETAIL MODE OF OPERATION TO ASSIST USER'S DRIVING

(75) Inventors: Judith H. Bank, Morrisville, NC (US); Lisa M. Bradley, Cary, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 13/535,121

(22) Filed: Jun. 27, 2012

(65) Prior Publication Data

US 2014/0005922 A1    Jan. 2, 2014

(51) Int. Cl.
G01C 21/36    (2006.01)
G08G 1/0968    (2006.01)

(52) U.S. Cl.
CPC ...... *G08G 1/096844* (2013.01); *G01C 21/3626* (2013.01); *G01C 21/3641* (2013.01); *G01C 21/3697* (2013.01); *G08G 1/096827* (2013.01); *G08G 1/096888* (2013.01)

(58) Field of Classification Search
CPC .............. G08G 1/096844; G08G 1/096888; G08G 1/096827; G01C 21/3626; G01C 21/3697; G01C 21/3641
USPC ........................................................ 701/423
See application file for complete search history.

(56) References Cited

U.S. PATENT DOCUMENTS

| | | | |
|---|---|---|---|
| 6,161,071 A * | 12/2000 | Shuman et al. ................. | 701/48 |
| 7,085,633 B2 | 8/2006 | Nishira et al. | |
| 7,099,776 B2 | 8/2006 | King et al. | |
| 7,224,290 B2 | 5/2007 | Takenaga et al. | |
| 7,471,212 B2 | 12/2008 | Krautter et al. | |
| 7,970,536 B2 * | 6/2011 | Ando ............................ | 701/418 |
| 8,131,467 B2 * | 3/2012 | Yoshioka et al. ............. | 701/437 |
| 8,200,426 B2 * | 6/2012 | Pu et al. ........................ | 701/412 |
| 8,606,516 B2 * | 12/2013 | Vertelney et al. ............. | 701/439 |
| 2004/0249535 A1 | 12/2004 | Maass et al. | |
| 2006/0080034 A1 * | 4/2006 | Hayashi ........................ | 701/211 |
| 2008/0036626 A1 | 2/2008 | Kim | |
| 2010/0045704 A1 * | 2/2010 | Kim .............................. | 345/660 |

(Continued)

OTHER PUBLICATIONS

IBM, "System and Method to Ensure Road Lane Safety and Track Issues During Inclement Weather," http://www.ip.com/pubview/IPCOM000187491D, Sep. 8, 2009.

(Continued)

*Primary Examiner* — Tuan C. To
(74) *Attorney, Agent, or Firm* — Robert A. Voigt, Jr.; Winstead, P.C.

(57) ABSTRACT

A method, system and computer program product for providing route guidance to a driver of a vehicle. Based on the current location of the vehicle, the navigation system determines a route to travel from the current location of the vehicle to a destination provided by the driver. The navigation system obtains information (e.g., past driving history of other drivers on the route) which is used to assess whether a super detail mode of operation (provides additional details than traditional GPS-based navigation systems thereby lessening the likelihood that the driver will get lost) should be enacted by the navigation system. The super detail mode of operation may be triggered by the navigation system based on a road condition (e.g., missed turn ratio of route exceeds a threshold) that warrants the super detail mode of operation where such a condition is determined to have occurred using the obtained information discussed above.

20 Claims, 5 Drawing Sheets

(56) References Cited

U.S. PATENT DOCUMENTS

| | | | |
|---|---|---|---|
| 2010/0049397 A1* | 2/2010 | Liu et al. | 701/33 |
| 2010/0138149 A1* | 6/2010 | Ohta et al. | 701/201 |
| 2010/0223003 A1* | 9/2010 | Harada | 701/201 |
| 2011/0109475 A1 | 5/2011 | Basnayake et al. | |
| 2011/0130956 A1* | 6/2011 | Tracton et al. | 701/201 |
| 2011/0144904 A1* | 6/2011 | Pinkus et al. | 701/201 |
| 2011/0166781 A1* | 7/2011 | Irie et al. | 701/201 |
| 2011/0208421 A1* | 8/2011 | Sakashita | 701/201 |
| 2011/0288766 A1* | 11/2011 | Nagasawa et al. | 701/201 |
| 2012/0191343 A1* | 7/2012 | Haleem | 701/431 |
| 2013/0245932 A1* | 9/2013 | Beaurepaire et al. | 701/409 |
| 2013/0338914 A1* | 12/2013 | Weiss | 701/465 |
| 2014/0176350 A1* | 6/2014 | Niehsen et al. | 340/988 |

OTHER PUBLICATIONS

Carstens, J. et al., "Method and System for Traffic Flow Control," http://www.ip.com/pubview/IPCOM000156093D, Aug. 20, 2007.

Anonymous; "A Computing Model for Real-Time Traffic Data Processing," http://priorartdatabase.com/IPCOM000211243D, Sep. 29, 2011.

* cited by examiner

NAVIGATION SYSTEM PROVIDING A SUPER DETAIL MODE OF OPERATION TO ASSIST USER'S DRIVING

TECHNICAL FIELD

The present invention relates generally to vehicle-based Global Positioning Systems (GPS), and more particularly to a navigation system providing a super detail mode of operation to assist the user's driving.

BACKGROUND

There is an increasing use of Global Positioning System (GPS)-based navigation systems in vehicles. Such navigation systems receive signals from an array of satellites which are part of the GPS. Based on received signals, GPS-based navigation systems may identify a vehicle's location in terms of latitude and longitude. The navigation system may also detect the vehicle's speed and direction of travel. With geographic information stored in an on-board computer in the vehicle, the navigation system is capable of audio-visually communicating to a user instructions for reaching a given destination.

A driver of a vehicle equipped with a GPS-based navigation system may manually input the address of a desired destination, and the navigation system may suggest one or more routes to the destination based on the map data and the user's present position. Presently, a GPS-based navigation system guides the driver to the desired destination via audio instructions, such as turn left in 20 feet. Oftentimes though such instructions are not detailed enough causing the driver to fail to follow the instruction, such as missing the upcoming turn, with the result of potentially getting lost or causing or becoming involved in an accident.

As a result of GPS-based navigation systems in vehicles failing to provide detailed guided instructions, the driver faces the risk of potentially getting lost or causing or becoming involved in an accident.

BRIEF SUMMARY

In one embodiment of the present invention, a method for providing route guidance to a driver of a vehicle comprises receiving a destination from the driver of the vehicle. The method further comprises identifying a current location of the vehicle. Additionally, the method comprises determining a route to travel from the current location of the vehicle to the destination. Furthermore, the method comprises obtaining one or more of the following: past driving history of the driver of the vehicle, past driving history of other drivers on the route, information about the route, current timing, information about external conditions and user customized conditions. The method further comprises monitoring road conditions of the route. In addition, the method comprises implementing, by a processor, a super detail mode of operation in response to a road condition of the route requiring a use of the super detail mode based on one or more of the following: the past driving history of the driver of the vehicle, the past driving history of other drivers on the route, the information about the route, the current timing, the information about external conditions and the user customized conditions, where the super detail mode of operation comprises more detailed guided instructions in comparison to a normal mode of operation.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing route guidance to a driver of a vehicle. In one embodiment of the present invention, the navigation system receives a destination from the driver of the vehicle. Based on the current location of the vehicle, the navigation system determines the route to travel from the current location of the vehicle to the destination. The navigation system obtains one or more of the following types of information which is used to assess whether a super detail mode of operation should be enacted by the navigation system: past driving history of the driver, past driving history of other drivers on the route, information about the route, current timing, information about external conditions (e.g., weather) and user customized conditions. A super detail mode of operation provides additional details (e.g., landmarks, street names, countdown to turns, warnings about non-visible signage and warnings about unidentified road hazards), such as via audio instructions, than traditional GPS-based navigation systems to make it easier for the driver to reach the destination and to lessen the likelihood of the driver getting lost or causing or becoming involved in an accident. The super detail mode of operation may be triggered by the navigation system based on a road condition (e.g., missed turn ratio of route exceeds a threshold) that warrants the super detail mode of operation where such a condition is determined to have occurred using the obtained information discussed above.

While the following discusses the present invention in connection with a GPS-based navigation system in a vehicle, the principles of the present invention may be applied to any GPS-based device, including smartphones. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
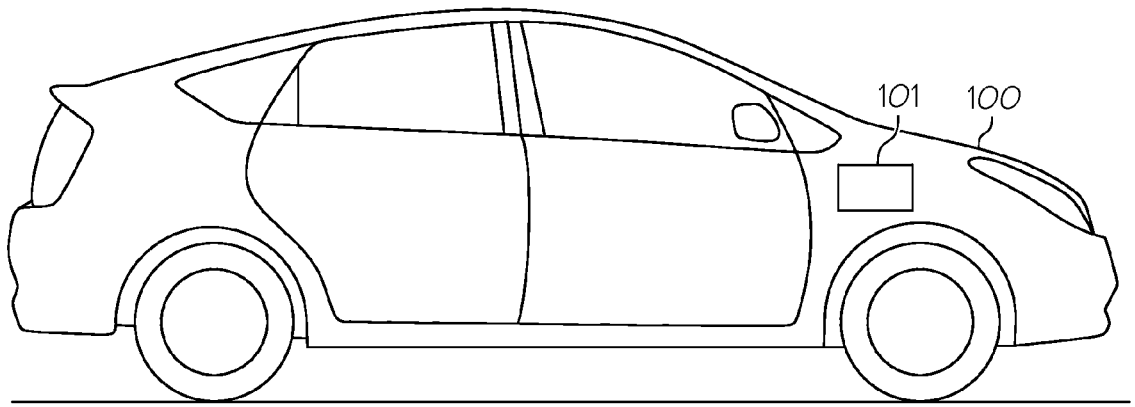
FIG. 1 illustrates a vehicle with a navigation system according to one embodiment of the present invention.

Referring now to the Figures in detail, FIG. 1 illustrates a vehicle 100 with a navigation system 101 according to one embodiment of the present invention. The basic navigation system 101 is shown in greater detail in FIG. 2.

Figure 2:
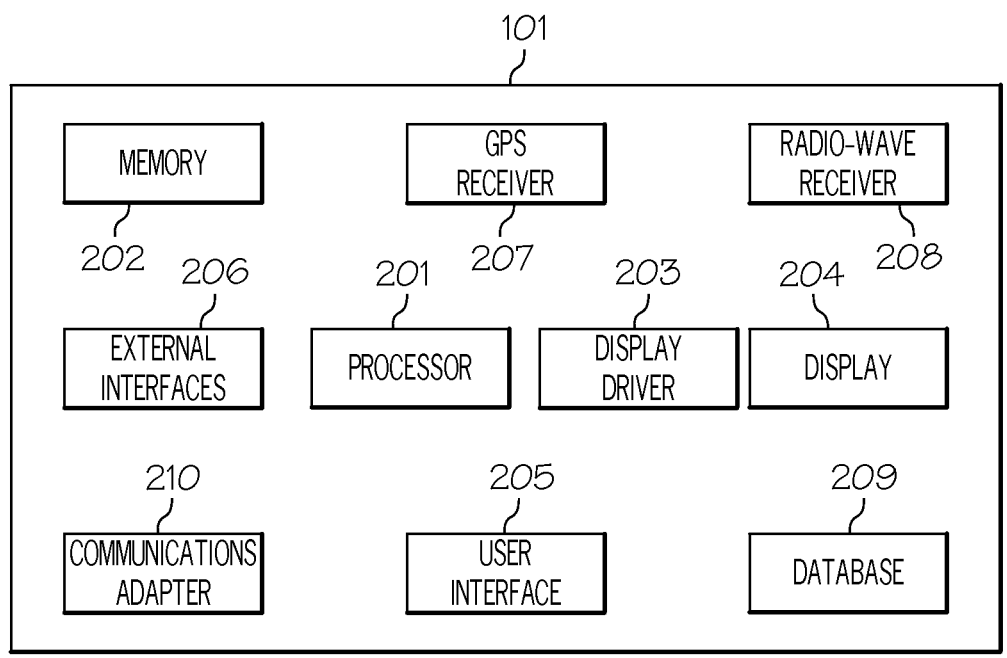
FIG. 2 illustrates an embodiment of the present invention of the navigation system.

FIG. 2 illustrates an embodiment of the present invention of navigation system 101 (FIG. 1). Referring to FIG. 2, navigation system 101 includes a processor 201, a memory 202, a display driver 203, a display 204, a user interface 205, external interfaces 206, a Global Positioning System (GPS) receiver 207, and a radio-wave receiver 208.

Memory 202 is used to store software and data for processor 201 to carry out various operations of navigation system 101. In this instance, the stored software may include a navigator web browser for browsing information provided, e.g., by servers connected to the Internet. In particular, the navigator browser works compatibly with the standard hypertext transfer protocol (HTTP), hypertext markup language (HTML), virtual reality markup language (VRML), graphics interchange format (GIF), JAVA applets, etc. In one embodiment, the stored software may further include an application for providing route guidance to a driver of a vehicle, such as in super detail mode, as discussed further below in connection with FIGS. 3 and 4A-4B.

Display 204 may include a conventional liquid crystal display (LCD). Through display driver 203, processor 201 controls the display of text and graphics on display 204 in a predetermined format. User interface 205 may comprise conventional audio circuitry including a microphone and speaker for the user to communicate with navigation system 101 via audio media. User interface 205 may also comprise an indicator device, e.g., a mouse, touchpad, roller ball, or a combination thereof, which may enable a user to move a cursor on display 204 and to point and click at a displayed option or an icon to select same. In addition, user interface 204 may incorporate well-known touch-screen circuitry (not shown). With this circuitry, the user can interact with processor 201 by using a finger or a stylus to touch the surface of display 204, which is tactile-sensitive. Processor 201 receives from the touch screen circuitry a signal identifying the location on display 204 where it has been touched. If such a location matches the predetermined location of one of displayed options or icons, processor 201 determines that the option or icon has been selected. Otherwise, a cursor is placed at the touched location on display 204, prompting for an input from the user.

The user input may be realized using a virtual keyboard shown on display 204 also provided by the touch-screen circuitry. In a well known manner, characters are input by touching the corresponding keys on the virtual keyboard. Alternatively, processor 201 may be programmed to recognize handwritten characters, and may receive through the touch-screen circuitry images of characters drawn by the user on display 204. Any recognized characters corresponding to the drawn images then become the user input. Still alternatively, through one of external interfaces 206, navigation system 101 can be connected to a keyboard device or a personal computer (PC) having a keyboard for user input. In any of these manners, the user may input a destination to navigation system 101. Furthermore, in any of these manners, the user may input customized conditions to trigger a super detail mode of operation as discussed further below.

In one embodiment, navigation system 101 includes radio-wave receiver 208 configured to receive an emergency location signal outputted by a radio-wave transmitter of an emergency vehicle. In this manner, navigation system 101 can detect an emergency vehicle nearby and implement the super detail mode of operation as discussed further below.

In one embodiment, navigation system 101 includes a database 209 that is configured to store map data that is used by navigation system 101 to provide driving directions to the driver of vehicle 100 to arrive at a destination from a current location of vehicle 100. In one embodiment, database 209 is configured to store the past driving history of the driver of vehicle 100. For example, such historical information may include whether the driver typically misses a turn when getting onto a highway, whether the driver typically misses a turn when driving on a new road, whether the driver typically misses a turn when it is dark out or when the visibility is low (e.g., no lights on the road), whether the driver typically misses a turn when there are two streets within a certain number of feet from each other, etc.

In one embodiment, database 209 may further store the past driving history of other drivers, such as those drivers that have driven down a route determined by navigation system 101 to be traveled by the driver of vehicle 100. The past driving history of other drivers traveling down the determined route may be obtained from an external database that is downloaded by navigation system 101 to database 209. In such an embodiment, navigation system 101 queries such a database by connecting to a network (not shown) (e.g., a wireless wide area network, a Global System for Mobile Communications (GSM) network, Wireless Application Protocol (WAP) network, a WiFi network, an IEEE 802.11 standards network, various combinations thereof, etc.) via a communication adapter 210. The past driving history of other drivers may include, for example, the missed turn ratio of other drivers or the number or percentage of other drivers rerouted on the determined route to be traveled by the driver of vehicle 100.

In one embodiment, database 209 may further store information about the route to be traveled by the driver of vehicle 100, such as the amount of construction on the route, whether the route is a detour route, the accident rate on the route, etc. In one embodiment, navigation system 101 obtains such information from an external database that is downloaded by navigation system 101 to database 209. In such an embodiment, navigation system 101 queries such a database by connecting to a network via communication adapter 210.

In one embodiment, database 209 may further store information about current timing and external conditions (e.g., weather). Timing information is provided by the GPS. Information about external conditions, such as weather, may be provided to navigation system 101 via an external database or a website that is downloaded by navigation system 101 to database 209. In such an embodiment, navigation system 101 queries such a database or website by connecting to a network via communication adapter 210.

In one embodiment, database 209 may further store user customized conditions. User customized conditions refer to conditions inputted by the user (driver of vehicle 100) that are to trigger the super detail mode of operation. For example, the user may indicate that if the calculated route includes a number of turns over a particular distance that exceeds an inputted threshold amount, then navigation system 101 is to enter the super detail mode of operation. In another example, the user may indicate that if the route is within an inputted threshold amount of feet from a cliff, then navigation system 101 is to enter the super detail mode of operation. Such information may be inputted to navigation system 101 by the user using any of the means discussed above in connection with the description of FIG. 2.

While the preceding discussed various types of information that may be stored in database 209, the principles of the present invention are not limited to such information. Database 209 may store any type of information that may be used by navigation system 101 to determine whether navigation system 101 should enter the super detail mode of operation to provide additional details in guiding the driver of vehicle 100 to reach his/her destination thereby lessening the likelihood of the driver getting lost. Furthermore, the principles of the present invention are not to be limited in scope to the examples provided above for the various types of information that may be used by navigation system 101 in determining whether to enter the super detail mode of operation. Such examples were provided for illustration to aid in the understanding of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, a driver of a vehicle equipped with a GPS-based navigation system may manually input the address of a desired destination, and the navigation system may suggest one or more routes to the destination based on the map data and the user's present position. Presently, a GPS-based navigation system guides the driver to the desired destination via audio instructions, such as turn left in 20 feet. Oftentimes though such instructions are not detailed enough causing the driver to fail to follow the instruction, such as missing the upcoming turn, with the result of potentially getting lost or causing or becoming involved in an accident. As a result of GPS-based navigation systems in vehicles failing to provide detailed guided instructions, the driver faces the risk of potentially getting lost or causing or becoming involved in an accident.

Figure 3:
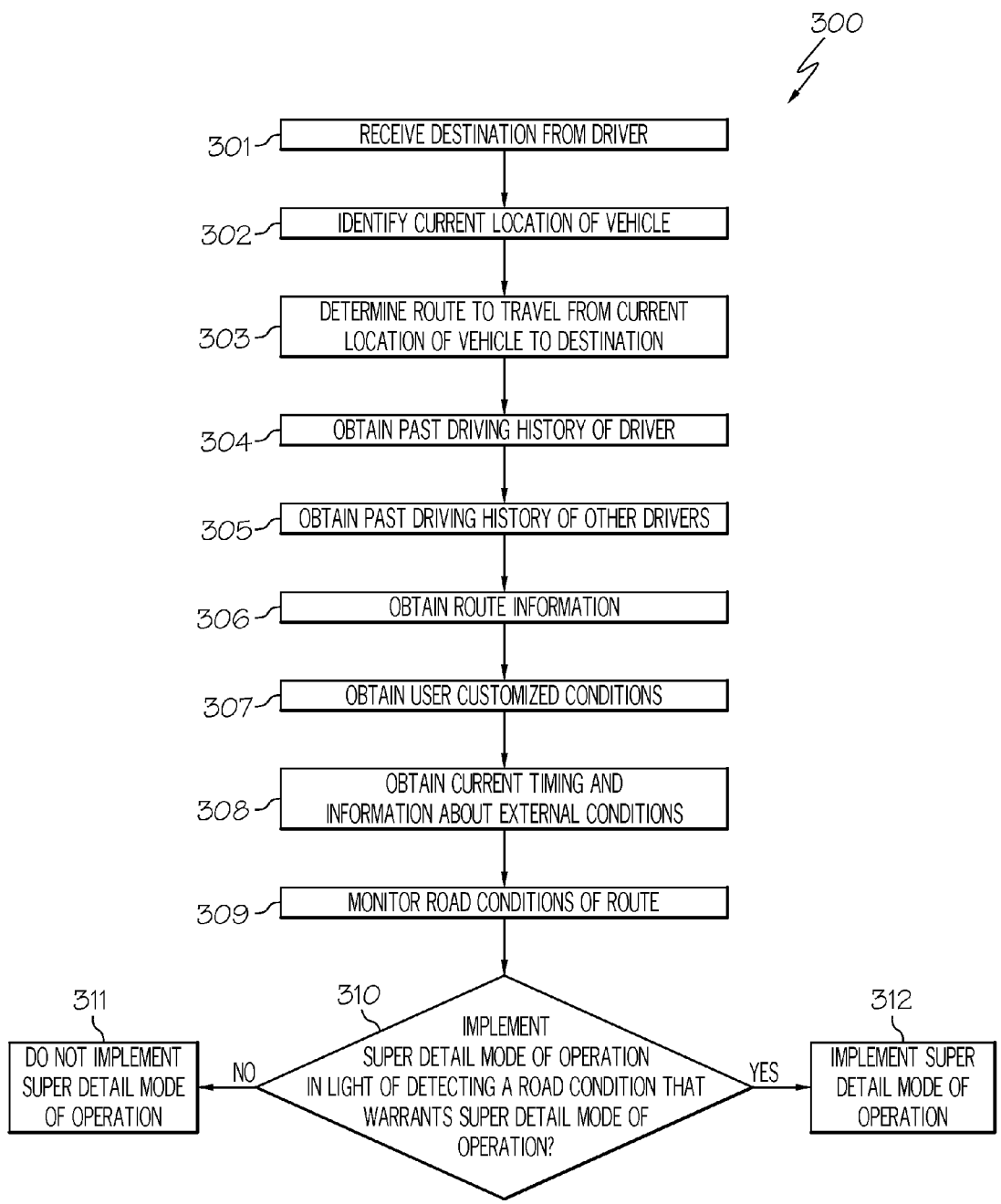
FIG. 3 is a flowchart of a method for providing a super detail mode of operation when a road condition warrants such a mode of operation in accordance with an embodiment of the present invention.
Figure 4A:
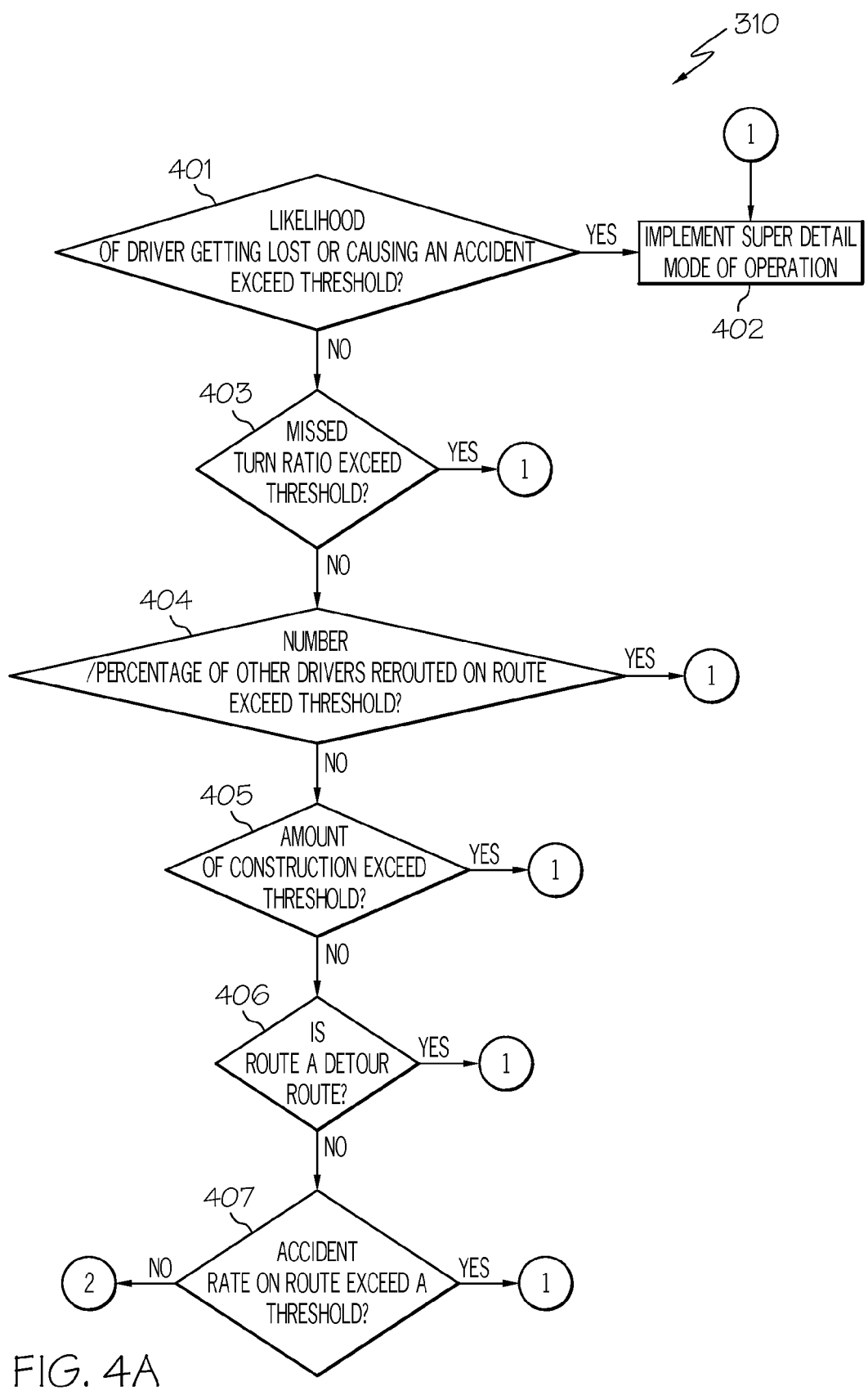
FIGS. 4A-4B are a flowchart of the sub-steps for determining whether to implement the super detail mode of operation.
Figure 4B:
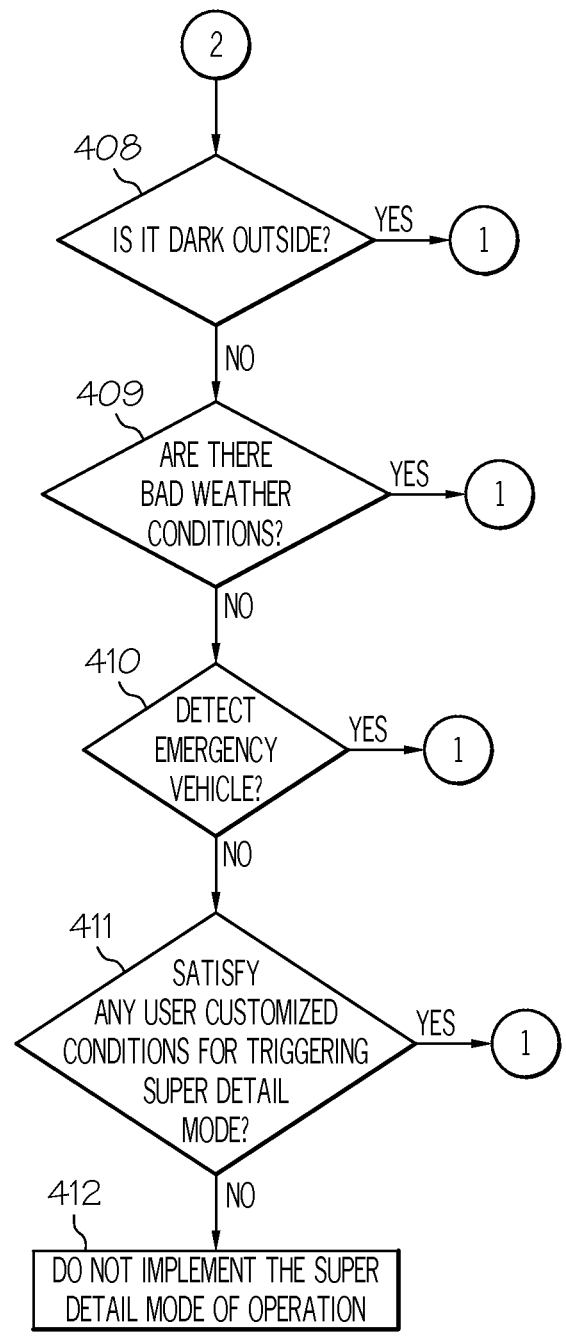

The principles of the present invention provide a means for providing a detailed route guidance to the driver of the vehicle when situations warrant. The detailed route guidance is referred to herein as the "super detail mode" of operation which includes providing additional details, such as via audio instructions, than traditional GPS-based navigation system operation (also referred to herein as the "normal mode of operation"). For example, the super detail mode of operation includes providing guided instructions that include landmarks (e.g., restaurants, fire hydrants), street names, countdown to turns, warning about non-visible signage, warnings about unidentified road hazards, etc. that provide additional route details to make it easier for the driver to reach the destination and to lessen the likelihood of the driver getting lost or causing or becoming involved in an accident. For instance, instead of the GPS-based navigation system (normal mode of operation) simply instructing the driver to turn left at 20 feet, the GPS-based navigation system is super detail mode of operation now would instruct the driver to turn left at the McDonalds prior to the railroad crossing. The conditions as to when the GPS-based navigation system enters the super detail mode of operation is discussed below in connection with FIG. 3 and 4A-4B. FIG. 3 is a flowchart of a method 300 for providing a super detail mode of operation when a road condition warrants such a mode of operation in accordance with an embodiment of the present invention. FIG. 4A-4B are a flowchart of the sub-steps for determining whether to implement the super detail mode of operation.

Referring to FIG. 3, in conjunction with FIGS. 1-2, in step 301, navigation system 101 receives a destination from the driver of vehicle 100. For example, the user may input the destination by using a virtual keyboard shown on display 204.

In step 302, navigation system 101 identifies the current location of vehicle 100 using the received signals from an array of satellites which are part of the GPS.

In step 303, navigation system 101 determines the route to travel from the current location of vehicle 100 to the destination based on map data (e.g., map data stored in database 209).

In step 304, navigation system 101 obtains the past driving history of the driver, such as from database 209.

In step 305, navigation system 101 obtains the past driving history of other drivers (such as those drivers that have driven on the route determined in step 303), such as from database 209.

In step 306, navigation system 101 obtains the information about the route determined to be traveled by the driver of vehicle 100 in step 303, such as from database 209.

In step 307, navigation system 101 obtains user customized conditions, such as from database 209.

In step 308, navigation system 101 obtains the current timing and information about external conditions (e.g., weather), such as from database 209.

In step 309, navigation system 101 monitors the road conditions of the route (route determined in step 303) for switching to a super detail mode of operation.

In step 310, a determination is made by navigation system 101 as to whether any road conditions require the use of the super detail mode of operation based on the information obtained in steps 304-308 as discussed further below in connection with FIGS. 4A-4B. Such road conditions are used to determine when navigation system 101 should switch to a super detail mode of operation from a normal mode of operation so as to provide additional details (e.g., landmarks, street names, countdown to turns, warnings about non-visible signage, warnings about unidentified road hazards) in its guided instructions (e.g., audio instructions) thereby providing additional assistance to the driver in reaching his/her destination so as to reduce the likelihood of the driver getting lost or causing or becoming involved in an accident. Such an analysis may be performed for a designated amount of distance (e.g., one mile) on the route determined to be traveled in step 303 and repeated thereafter. A discussion of such an analysis is provided below in connection with FIGS. 4A-4B.

If there are no road conditions that require the use of the super detail mode of operation, then, in step 311, navigation system 101 does not implement the super detail mode of operation.

If, however, there is a road condition that requires the use of the super detail mode of operation, then, in step 312, navigation system 101 implements the super detail mode of operation as discussed above.

There are various road conditions that may be monitored for determining whether navigation system 101 should switch to the super detail mode of operation. An exemplary embodiment of the determination made by navigation system 101 in step 310 as to whether any road conditions require the use of the super detail mode of operation based on the information obtained in steps 304-308 is discussed below in connection with FIGS. 4A-4B. Such an analysis may be performed for a designated amount of distance (e.g., one mile) on the route determined to be traveled in step 303 and repeated thereafter. For example, navigation system 101 may determine whether there are any road conditions (e.g., whether the missed turn ratio over the next one mile exceeds a threshold, whether the amount of construction over the next one mile exceeds a threshold) over the next mile that warrant the use of the super detail mode of operation. After traveling the mile, navigation system 101 may repeat the process in determining whether there are any road conditions over the following mile that warrant the use of the super detail mode of operation and so forth. In one embodiment, when the analysis of step 310 is repeated, method 300 may obtain the current timing and information about external conditions (e.g., weather) in step 308 as well as obtain any other information that was updated, such as information about the route in step 306, as navigation system 101 continues to monitor the road conditions of the route in step 309.

Referring to FIG. 4A, in conjunction with FIGS. 1-3, in step 401, a determination is made by navigation system 101 as to whether the likelihood that the driver of vehicle 100 will get lost or causing or becoming involved in an accident exceeds a threshold based on the obtained past driving history of the driver of vehicle 100. For example, the past driving history of the driver may include whether the driver typically misses a turn when getting onto a highway, whether the driver typically misses a turn when driving on a new road, whether the driver typically misses a turn when it is dark out or when the visibility is low (e.g., no lights on the road), whether the driver typically misses a turn when there are two streets within a certain number of feet from each other, etc. Based on the historical performance of the driver, a determination may be made as to the likelihood of the driver getting lost/causing an accident on the route determined by navigation system 101 to be traveled by the driver in step 303. Such a determination may involve the use of other obtained information, such as current timing and weather information, route information (e.g., no road lights on route), etc. Based on the determined likelihood of the driver getting lost/causing an accident on the route determined by navigation system 101 to be traveled by the driver in step 303, a comparison is made to a threshold.

If the likelihood of the driver getting lost/causing an accident on the route determined by navigation system 101 to be traveled by the driver in step 303 exceeds a threshold, then, in step 402, navigation system 101 implements the super detail mode of operation as discussed above.

If, however, the likelihood of the driver getting lost/causing an accident on the route determined by navigation system 101 in step 303 to be traveled by the driver does not exceed a threshold, then, in step 403, a determination is made by navigation system 101 as to whether the missed turn ratio exceeds a threshold based on the obtained past driving history of other drivers. For example, navigation system 101 may compare the missed turn ratio of other drivers on the route determined by navigation system 101 in step 303 to a threshold. If such a missed turn ratio exceeds a threshold, then, in step 402, navigation system 101 implements the super detail mode of operation as discussed above.

If, however, the missed turn ratio of other drivers on the route determined by navigation system 101 to be traveled by the driver in step 303 does not exceed a threshold, then, in step 404, a determination is made by navigation system 101 as to whether the number or percentage of other drivers that were rerouted on the route determined by navigation system 101 in step 303 to be traveled by the driver exceed a threshold based on the obtained past driving history of other drivers. For example, navigation system 101 may compare the number or percentage of other drivers that were rerouted on the route determined by navigation system 101 in step 303 to a threshold. If the number or percentage of other drivers that were rerouted on the route determined by navigation system 101 in step 303 exceed a threshold, then, in step 402, navigation system 101 implements the super detail mode of operation as discussed above.

If, however, the number or percentage of other drivers that were rerouted on the route determined by navigation system 101 in step 303 does not exceed a threshold, then, in step 405, a determination is made by navigation system 101 as to whether the amount of construction on the route determined by navigation system 101 in step 303 to be traveled by the driver exceeds a threshold based on the obtained information about the route. For example, navigation system 101 may compare the amount of construction on the route determined by navigation system 101 in step 303 to a threshold. If the amount of construction on the route determined by navigation system 101 in step 303 exceeds a threshold, then, in step 402, navigation system 101 implements the super detail mode of operation as discussed above.

If, however, the amount of construction on the route determined by navigation system 101 in step 303 does not exceed a threshold, then, in step 406, a determination is made by navigation system 101 as to whether the route determined by navigation system 101 in step 303 to be traveled by the driver is a detour route based on the obtained information about the route. If the route determined by navigation system 101 in step 303 is a detour route, then, in step 402, navigation system 101 implements the super detail mode of operation as discussed above.

If, however, the route determined by navigation system 101 in step 303 is not a detour route, then, in step 407, a determination is made by navigation system 101 as to whether the accident rate on the route determined by navigation system 101 in step 303 to be traveled by the driver exceeds a threshold based on the obtained information about the route. For example, navigation system 101 may compare the accident rate on the route determined by navigation system 101 in step 303 to a threshold. If the accident rate on the route determined by navigation system 101 in step 303 exceeds a threshold, then, in step 402, navigation system 101 implements the super detail mode of operation as discussed above.

Referring to FIG. 4B, in conjunction with FIGS. 1-3, if, however, the accident rate on the route determined by navigation system 101 in step 303 does not exceed a threshold, then, in step 408, a determination is made by navigation system 101 as to whether it is currently dark outside based on the obtained current timing information. For example, navigation system 101 may compare the current timing information to the time the sun sets for that particular day. If it is deemed to be dark outside, then, in step 402, navigation system 101 implements the super detail mode of operation as discussed above.

If is not currently dark outside, then, in step 409, a determination is made by navigation system 101 as to whether there is currently a bad weather condition (e.g., raining heavily, snowing, foggy) based on the obtained information about external conditions. If it is deemed that the current weather condition is bad (e.g., raining heavily, snowing, foggy), then, in step 402, navigation system 101 implements the super detail mode of operation as discussed above.

If, however, the current weather condition is not considered to be a bad weather condition, then, in step 410, a determination is made by navigation system 101 as to whether it detects an emergency vehicle. For example, the emergency vehicle may be equipped with a radio-wave transmitter unit that transmits an emergency location signal. When such a signal is received by radio-wave receiver 208 of navigation system 101, navigation system 101 detects an emergency vehicle as well as the location of the emergency vehicle. Upon detecting an emergency vehicle, navigation system 101, in step 402, implements the super detail mode of operation as discussed above. The super detail mode of operation may include voice instructions that directs the driver into a lane or location to safely get out of the way of the approaching emergency vehicle while still being on route to the destination.

If, however, navigation system 101 does not detect an emergency vehicle, then, in step 411, a determination is made by navigation system 101 as to whether any user customized conditions are satisfied for triggering the super detail mode of operation. For example, user customized conditions may include a particular number of turns over a particular distance, the route being within a particular number of feet from a cliff, etc. If such a user customized condition is satisfied, then, in step 402, navigation system 101 implements the super detail mode of operation as discussed above.

If, however, a user customized condition is not satisfied, then, in step 412, navigation system 101 does not implement the super detail mode of operation.

The road conditions discussed above in connection with determining whether a super detail mode of operation is warranted is illustrative. The principles of the present invention are not to be limited in scope of the specific conditions discussed above. Neither are the principles of the present invention to be limited in scope to the particular decision making steps that are described in FIGS. 4A-4B. The scope of the principles of the present invention is to cover any condition or combination of conditions (e.g., dark and high accident rate) that may be used to assess whether it would desirable for navigation system 101 to implement a super detail mode of operation to lessen the likelihood that the driver will get lost. Furthermore, any of the conditions, including the exemplary conditions discussed herein, are customizable by the user. Furthermore, the scope of the principles of the present invention is to include any information that may be used to assess such conditions as to whether a super detail mode of operation is warranted.

Additionally, the principles of the present invention cover the situations involving the user manually toggling the switching between the normal mode of operation and the super detail mode of operation including the ability to override the program's determination of super detail mode of operation.

In some implementations, method 300 may include other and/or additional steps that, for clarity, are not depicted. Further, in some implementations, method 300 may be executed in a different order presented and that the order presented in the discussion of FIGS. 3 and 4A-4B is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing route guidance to a driver of a vehicle, the method comprising:
    receiving a destination from said driver of said vehicle;
    identifying a current location of said vehicle;
    determining a route to travel from said current location of said vehicle to said destination;
    obtaining the following: past driving history of said driver of said vehicle, past driving history of other drivers on said route, information about said route, current timing, information about external conditions and user customized conditions;
    monitoring road conditions of said route; and
    implementing, by a processor, a super detail mode of operation in response to a road condition of said route requiring a use of said super detail mode based on one or more of said past driving history of said driver of said vehicle, said past driving history of other drivers on said route, said information about said route, said current timing, said information about external conditions and said user customized conditions, wherein said super detail mode of operation comprises more detailed guided audio instructions in comparison to a normal mode of operation.

2. The method as recited in claim 1, wherein said guided audio instructions of said super detail mode of operation comprises one or more of the following: landmarks, street names, countdown to turns, warnings about non-visible signage and warnings about unidentified road hazards.

3. The method as recited in claim 1 further comprising:
    implementing said super detail mode of operation in response to determining that a likelihood that said driver of said vehicle will get lost or cause an accident exceeds a threshold based on said past driving history of said driver of said vehicle.

4. The method as recited in claim 1 further comprising:
    implementing said super detail mode of operation in response to determining one of the following based on said past driving history of other drivers on said route: a missed turn ratio exceeds a first threshold and a number or a percentage of other drivers rerouted on said route exceed a second threshold.

5. The method as recited in claim 1 further comprising:
    implementing said super detail mode of operation in response to determining one of the following based on said information about said route: an amount of construction on said route exceeds a first threshold, said route is a detour route and an accident rate on said route exceeds a second threshold.

6. The method as recited in claim 1 further comprising:
    implementing said super detail mode of operation in response to determining one of the following based on said current timing and said information about external conditions: a bad weather condition and outside being dark.

7. The method as recited in claim 1 further comprising:
    implementing said super detail mode of operation in response to detecting an emergency vehicle.

8. The method as recited in claim 1 further comprising:
    implementing said super detail mode of operation in response to satisfying one of said user customized conditions, wherein said user customized conditions comprises one or more of the following: a number of turns over a particular distance that exceeds a threshold and said route being within a threshold number of feet from a cliff.

9. A computer program product embodied in a computer readable storage medium for providing route guidance to a driver of a vehicle, the computer program product comprising the programming instructions for:
    receiving a destination from said driver of said vehicle;
    identifying a current location of said vehicle;
    determining a route to travel from said current location of said vehicle to said destination;
    obtaining the following: past driving history of said driver of said vehicle, past driving history of other drivers on said route, information about said route, current timing, information about external conditions and user customized conditions;
    monitoring road conditions of said route; and
    implementing a super detail mode of operation in response to a road condition of said route requiring a use of said super detail mode based on one or more of said past driving history of said driver of said vehicle, said past driving history of other drivers on said route, said information about said route, said current timing, said information about external conditions and said user customized conditions, wherein said super detail mode of operation comprises more detailed guided audio instructions in comparison to a normal mode of operation.

10. The computer program product as recited in claim 9, wherein said guided audio instructions of said super detail mode of operation comprises one or more of the following: landmarks, street names, countdown to turns, warnings about non-visible signage and warnings about unidentified road hazards.

11. The computer program product as recited in claim 9 further comprising the programming instructions for:
    implementing said super detail mode of operation in response to determining that a likelihood that said driver of said vehicle will get lost or cause an accident exceeds a threshold based on said past driving history of said driver of said vehicle.

12. The computer program product as recited in claim 9 further comprising the programming instructions for:
    implementing said super detail mode of operation in response to determining one of the following based on said past driving history of other drivers on said route: a missed turn ratio exceeds a first threshold and a number or a percentage of other drivers rerouted on said route exceed a second threshold.

13. The computer program product as recited in claim 9 further comprising the programming instructions for:
  implementing said super detail mode of operation in response to determining one of the following based on said information about said route: an amount of construction on said route exceeds a first threshold, said route is a detour route and an accident rate on said route exceeds a second threshold.

14. The computer program product as recited in claim 9 further comprising the programming instructions for:
  implementing said super detail mode of operation in response to determining one of the following based on said current timing and said information about external conditions: a bad weather condition and outside being dark.

15. The computer program product as recited in claim 9 further comprising the programming instructions for:
  implementing said super detail mode of operation in response to detecting an emergency vehicle.

16. The computer program product as recited in claim 9 further comprising the programming instructions for:
  implementing said super detail mode of operation in response to satisfying one of said user customized conditions, wherein said user customized conditions comprises one or more of the following: a number of turns over a particular distance that exceeds a threshold and said route being within a threshold number of feet from a cliff.

17. A navigation system, comprising:
  a memory unit for storing a computer program for providing route guidance to a driver of a vehicle; and
  a processor coupled to said memory unit, wherein said processor, responsive to said computer program, comprises:
    circuitry for receiving a destination from said driver of said vehicle;
    circuitry for identifying a current location of said vehicle;
    circuitry for determining a route to travel from said current location of said vehicle to said destination;
    circuitry for obtaining the following: past driving history of said driver of said vehicle, past driving history of other drivers on said route, information about said route, current timing, information about external conditions and user customized conditions;
    circuitry for monitoring road conditions of said route; and
    circuitry for implementing a super detail mode of operation in response to a road condition of said route requiring a use of said super detail mode based on one or more of said past driving history of said driver of said vehicle, said past driving history of other drivers on said route, said information about said route, said current timing, said information about external conditions and said user customized conditions, wherein said super detail mode of operation comprises more detailed guided audio instructions in comparison to a normal mode of operation.

18. The navigation system as recited in claim 17, wherein said guided audio instructions of said super detail mode of operation comprises one or more of the following: landmarks, street names, countdown to turns, warnings about non-visible signage and warnings about unidentified road hazards.

19. The navigation system as recited in claim 17, wherein said processor further comprises:
  circuitry for implementing said super detail mode of operation in response to determining that a likelihood that said driver of said vehicle will get lost or cause an accident exceeds a threshold based on said past driving history of said driver of said vehicle.

20. The navigation system as recited in claim 17, wherein said processor further comprises:
  circuitry for implementing said super detail mode of operation in response to determining one of the following based on said past driving history of other drivers on said route: a missed turn ratio exceeds a first threshold and a number or a percentage of other drivers rerouted on said route exceed a second threshold.

* * * * *